United States Patent [19]

Goetz et al.

[11] 3,789,316
[45] Jan. 29, 1974

[54] SINE-COSINE FREQUENCY TRACKER

[75] Inventors: Philip J. Goetz, Pleasantville; Leon R. Solomon, Ossining, both of N.Y.

[73] Assignee: The Singer Company, Little Falls, N.J.

[22] Filed: June 13, 1973

[21] Appl. No.: 369,749

[52] U.S. Cl. ............... 331/12, 329/124, 331/22, 331/25, 331/31, 331/32
[51] Int. Cl. .............................................. H03b 3/10
[58] Field of Search ............ 331/12, 22, 25, 31, 32; 329/124, 125

[56] References Cited
UNITED STATES PATENTS

| | | | |
|---|---|---|---|
| 2,731,566 | 1/1956 | Chalhoub | 331/12 |
| 3,121,202 | 2/1964 | Gray | 331/11 |
| 3,123,769 | 3/1964 | Meyer | 331/12 X |
| 3,748,590 | 7/1973 | Gray | 331/12 |

*Primary Examiner*—Herman Karl Saalbach
*Assistant Examiner*—Siegfried H. Grimm

[57] ABSTRACT

A sine-cosine frequency tracking system is provided for tracking the center of power of a Doppler type input signal. The system of the invention includes a discriminator connected in an error feedback loop, and which develops an error signal whenever the center frequency of the input signal differs from the frequency of a pair of sine-cosine keying signals. The aforesaid discriminator incorporates solid state integrated circuitry, and it is constructed to eliminate the need for difficult trim adjustments which are necessary in the prior art systems. The aforesaid discriminator also serves to improve the accuracy of the system by removing error sources present in the prior art systems.

6 Claims, 5 Drawing Figures

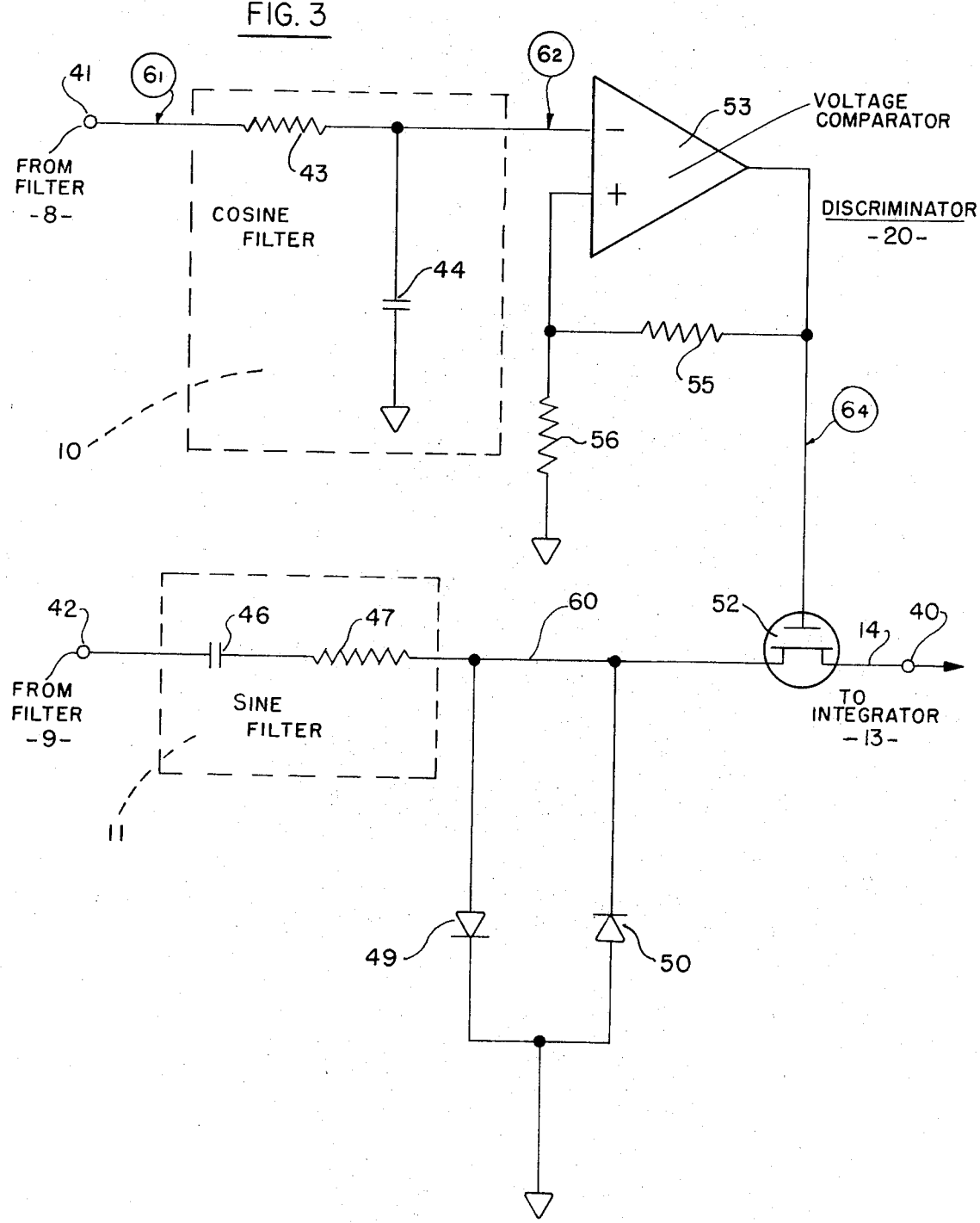

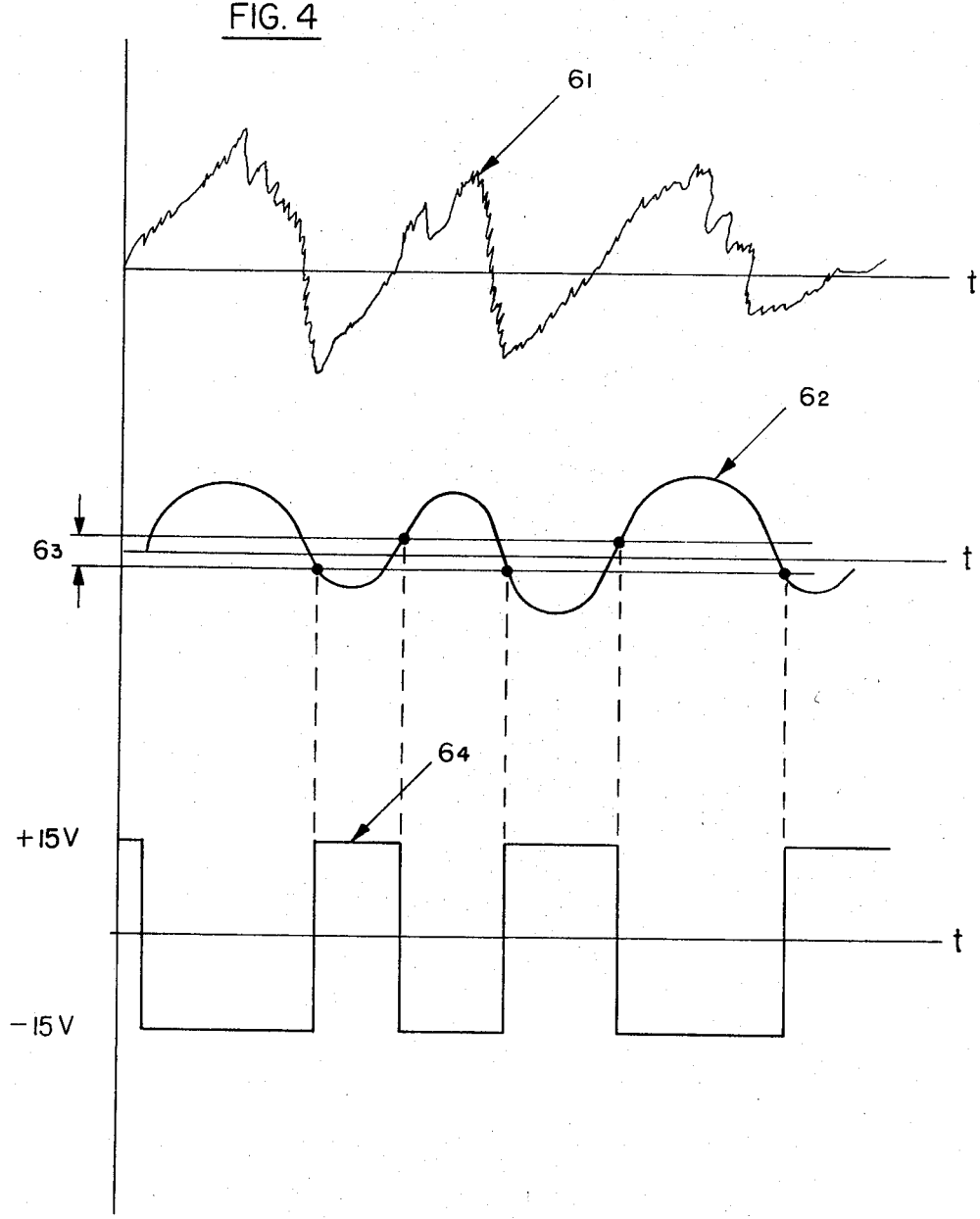

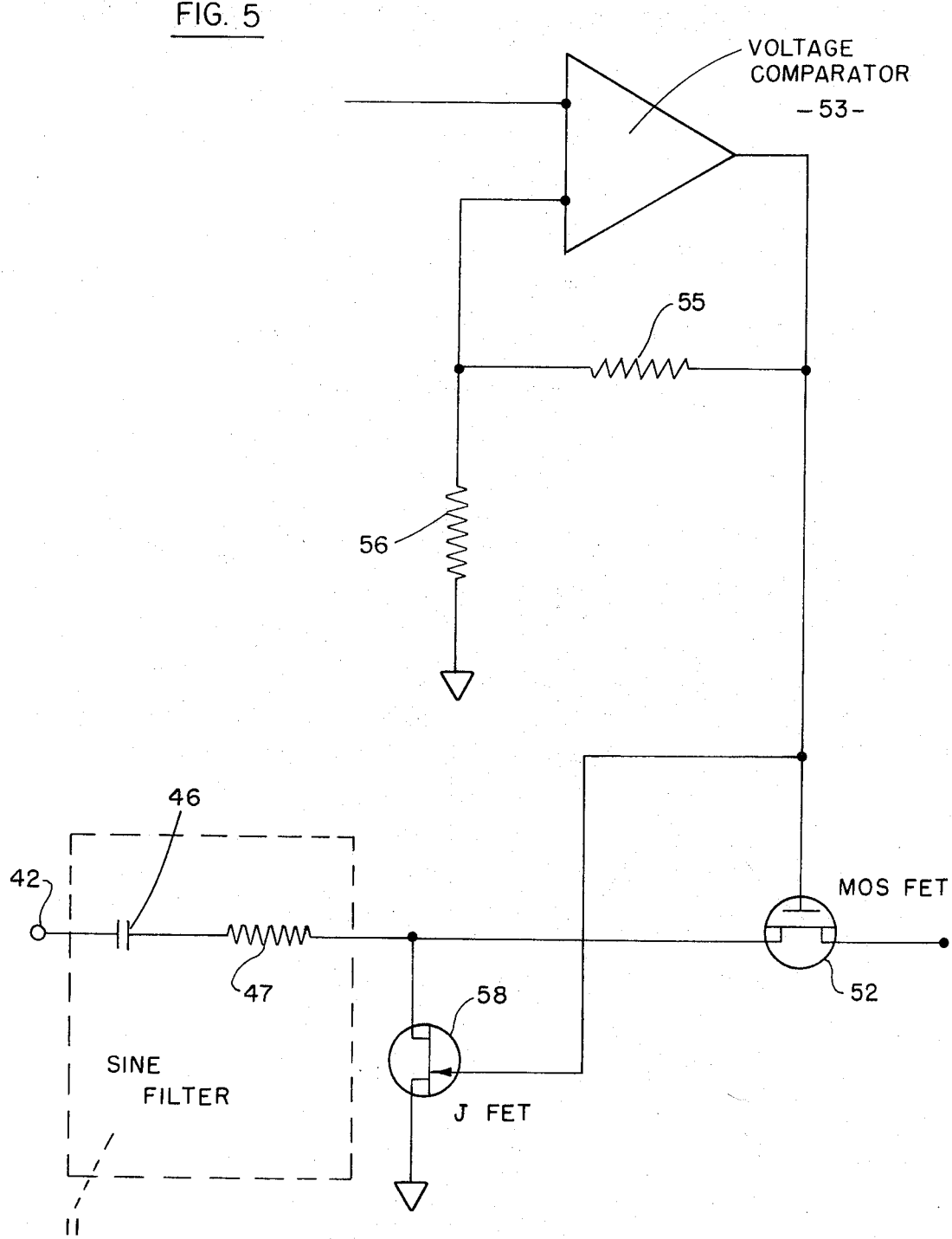

SINE-COSINE FREQUENCY TRACKER

BACKGROUND OF THE INVENTION

A sine-cosine frequency tracking system is described in U.S. Pat. No. 3,121,202. As pointed out in the patent, frequency trackers are required in aircraft navigational instruments employing the Doppler difference frequencies of microwave echo signals. The frequency spectra of such echo signals fluctuate, so that special apparatus is necessary to track the fluctuating frequencies. The frequency tracker described in the patent includes a modulator which receives a Doppler echo signal, and to which is applied an oscillator signal of substantially the same frequency as the Doppler echo signal. The difference side band of the modulator output at essentially zero frequency is applied through low pass filters to a discriminator in the prior art system to provide an error signal. The error signal is then fed back to control the oscillator frequency.

It is necessary in frequency tracking systems of the type described in the aforesaid patent, and of the type to be described herein, to secure a discriminator output signal which distinguishes by its polarity, the sense of the tracking error. This is achieved by applying to the discriminator two signals equal in frequency but in phase quadrature to one another. These phase quadrature signals contain the tracking sense information and produce the required loop error signal.

In the system described in the aforesaid patent, and in the system of the present invention, an adjustable oscillator is provided whose output is split into two phase quadrature signals, that latter being applied to two balanced modulators, or heterodyne mixers, which receive the Doppler input signal. The oscillator frequency corresponds to the mid-frequency of the Doppler signal spectrum at balance. The two outputs of the balanced modulators, after passage through two low pass filters, are applied to a discriminator which produces a direct current error signal having a magnitude and sign representative of the disparity between the oscillator frequency and the center frequency of the Doppler spectrum of the input signal. This error signal is integrated and fed back to the oscillator, the frequency of which is thereby controlled to be maintained as closely approximate to the Doppler spectrum center frequency.

The improved system of the present invention includes an improved discriminator circuit which, as mentioned above, eliminates difficult trim adjustments; and which also improves the accuracy of the system as compared with the prior art systems, by removing error sources which are usually present in the prior art systems.

BRIEF DESCRIPTION OF THE DRAWINGS

FIG. 3 is a circuit diagram of a discriminator used in the system of FIG. 1, in accordance with the concepts of the present invention;

FIG. 4 is a series of curves corresponding to waveforms produced in the circuit of FIG. 3; and FIG. 5 is a fragmentary circuit showing a modification of the circuit of FIG. 3 in accordance with a second embodiment of the invention.

DETAILED DESCRIPTION OF THE ILLUSTRATED EMBODIMENTS

Figure 1:
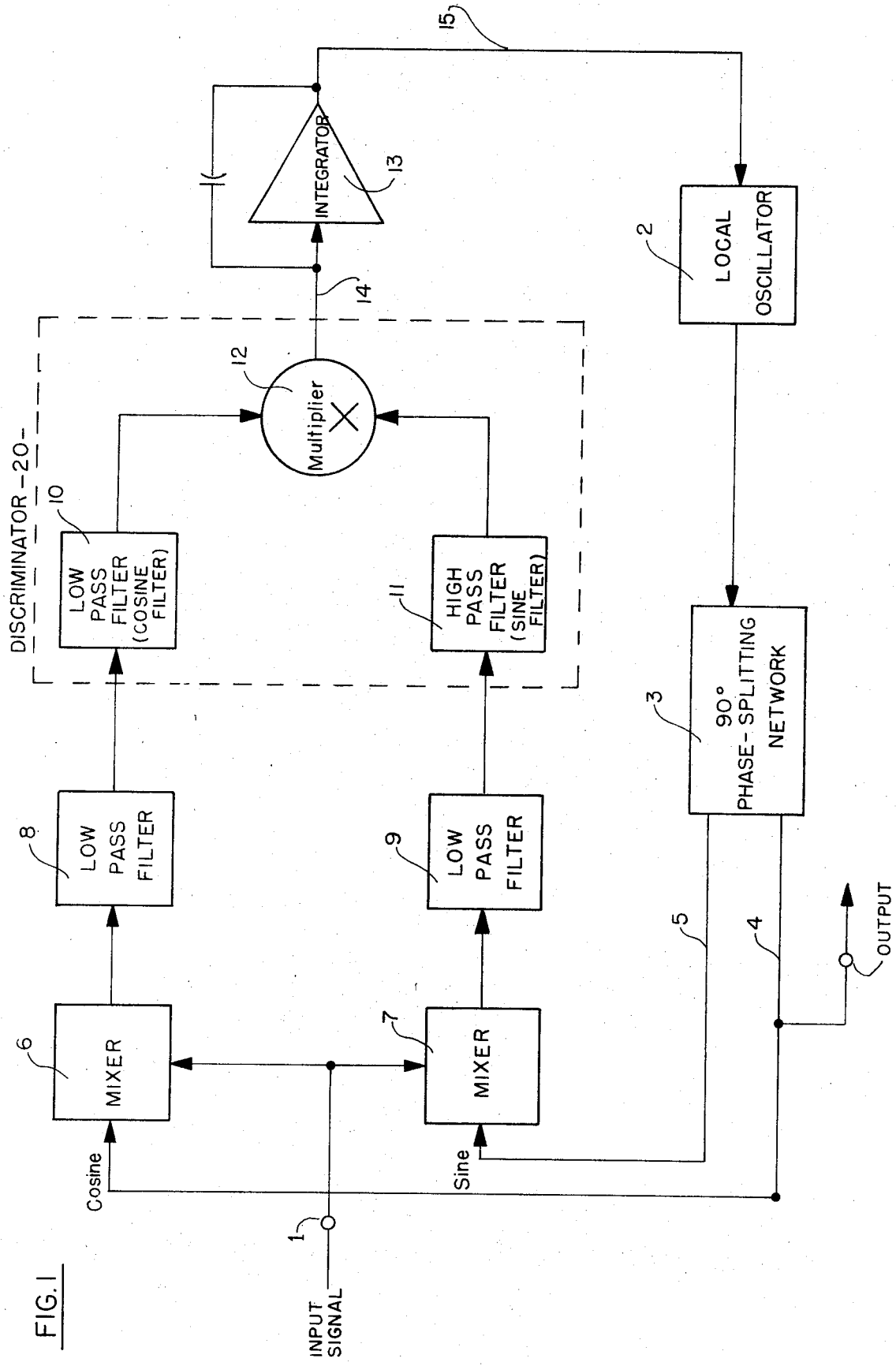
FIG. 1 is a block diagram of a sine-cosine frequency tracking system which may be constructed to incorporate the concepts of the invention.

A block diagram of the basic tracking loop of a sine-cosine frequency tracking system for tracking the center of power of a Doppler type input signal is shown in FIG. 1. The loop consists of a local oscillator 2 which is included in a feedback loop; a 90° phase-splitting network 3, which generates quadrature cosine and sine keying signals 4 and 5 at one-fourth the local oscillator frequency; two balanced modulators or heterodyne mixers 6 and 7; two low-pass partition filters 8 and 9; a low-pass filter 10 (referred to as the cosine filter); a high-pass filter 11 (referred to as the sine filter); a multiplier 12; and an integrator 13 which closes the loop by providing a frequency controlling signal to the oscillator 2. The cosine filter 10, the sine filter 11 and the multiplier 12 together form a discriminator 20 for the system.

The action of the system is such that an error current 14 is generated by the discriminator 20 whenever the center frequency of the input signal 1 differs from the frequency of the sine-cosine keying signals 4 and 5. The mixers 6 and 7 heterodyne the input signal with the quadrature keying signals to produce sum and difference frequencies in each channel. The low-pass partion filters 8 and 9 reduce the sum frequencies in each channel to an insignificant level without materially affecting the difference frequencies, since the latter are relatively low in their useful range. At this point the difference frequencies in one channel are still 90° out of phase with their counterparts in the other channel.

The sine filter 11 and cosine filter 10 add additional phase shift to the signals in such a manner that phase equality between the two channels is restored. The multiplier 12 then creates a DC current 14 proportional to the frequency error. The integrator 13 nulls this current by changing its output voltage 15, and thereby the frequency of the local oscillator 2, thus closing the loop.

Figure 2:
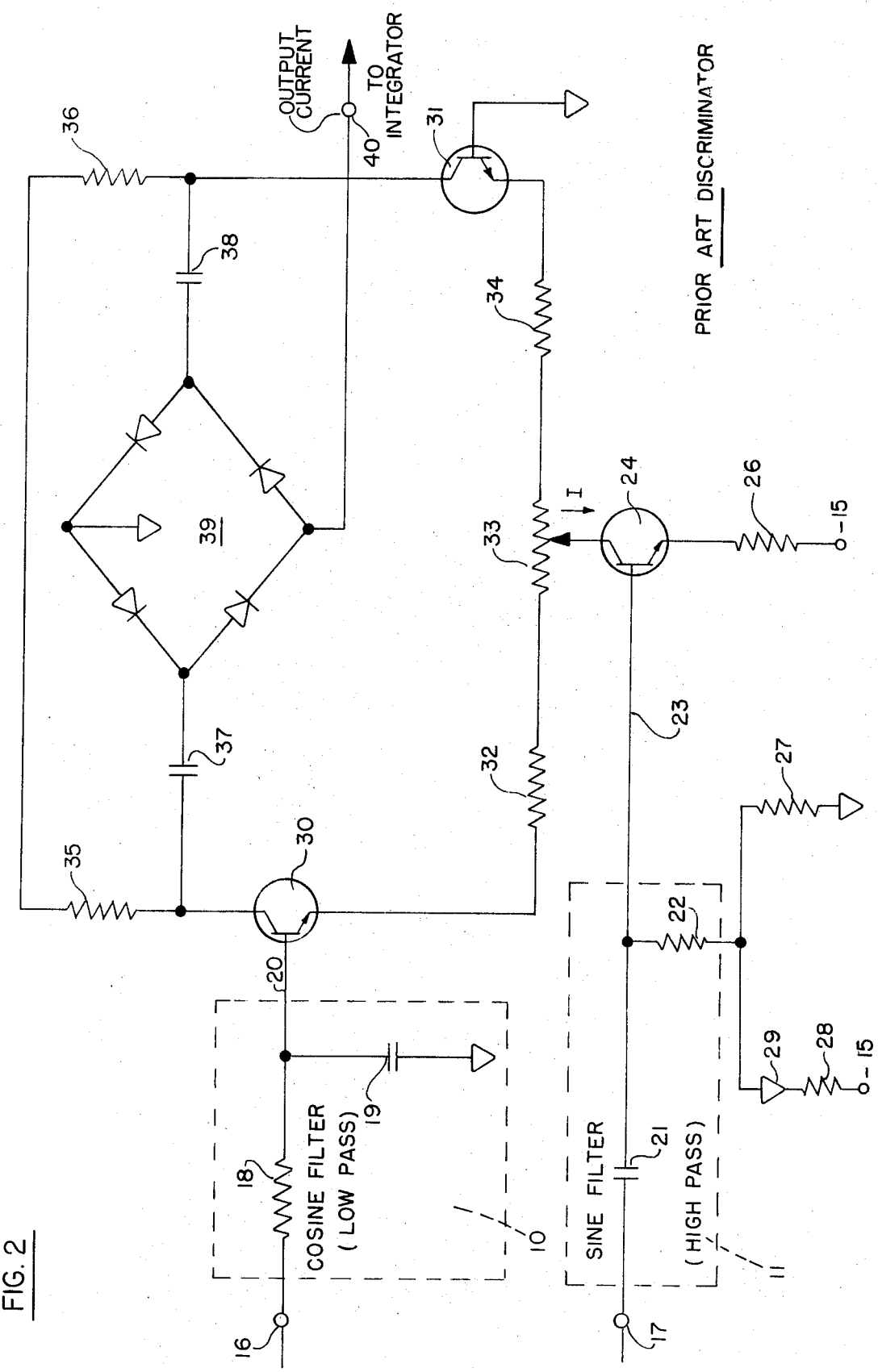
FIG. 2 is a circuit representation of a prior art discriminator previously used in the system of FIG. 1.

The circuit of FIG. 2 shows a typical circuit for the discriminator 20 as used in the prior art, and as exemplified in U.S. Pat. No. 3,121,202. In the circuit of FIG. 2, the cosine filter 10 is formed of a resistor 18 series connected between the input terminal 16 and an NPN transistor 30, a capacitor 19 being connected from the base of the transistor to a point of reference potential. The sine filter 11, on the other hand, includes a capacitor 21 series-connected between an input terminal 17 and the base of an NPN transistor 24; and a resistor 22 which connects the base of the transistor to a resistor 27 and through a diode 29 to a resistor 28.

The resistor 28 is connected to a negative 15-volt source, and the resistor 27 is connected to a point of reference potential, to provide bias for the transistor 24. The emitter of the transistor 24 is connected through a resistor 26 to the 15-volt negative voltage source. The emitter of the transistor 20 is connected through a resistor 32 and through potentiometer 33 to a resistor 34. The movable arm of the potentiometer 33 is connected to the collector of the transistor 24.

The collector of the transistor 30 is connected to a resistor 35 and through a capacitor 37 to a full-wave rectifier bridge 39. The bridge is also connected through a capacitor 38 to the collector of an NPN transistor 31. The emitter of the transistor 31 is connected to the resistor 34, the base of the transistor is connected to the point of reference potential, and its collector is connected through a resistor 36 back to the resistor 35. The output current appears at the output terminal 40 of the circuit.

The prior art discriminator of FIG. 2 accepts inputs from the cosine and sine partition filters 8 and 9 respectively at the input terminals 16 and 17. The resistor 18 and capacitor 19 form the low-pass cosine filter 10 yielding an output signal 20. The capacitor 21 and resistor 22 form the high-pass sine filter 11 yielding an output signal 23. The transistor 24 is used to generate an output current I proportional to the output 23 of the sine filter. Resistors 26, 27 and 28 are used to establish the bias point of the transistor 24 which is temperature compensated by the diode 29.

The transistors 30 and 31 form a differential amplifier, the gain of which is determined principally by the resistors 32, 34, 35 and 36. The gain balance of the amplifier is set by adjustment of the balance potentiometer 33. The operation of the diode bridge 39 is such that the average current available at the output terminal 40 is the product of the cosine filter output 20 and the sine filter output 23.

A difficulty in the operation of the prior art circuit of FIG. 2 is that the potentiometer 33 must be adjusted with a high degree of precision during the construction of the circuit. If the potentiometer is not precisely set, the discriminator action will be asymmetrical and, as a result, the operation of the frequency tracking system will be in error. The resultant error in the operation of the prior art frequency tracking system of FIG. 2, however, cannot be easily compensated at other points in the system because the exact magnitude of the error depends upon the input signal-to-noise ratio as well as on the spectrum bandwidth.

It has been found in the prior art that the correct setting of the potentiometer 33 is most time consuming and requires a precise input signal simulator. Also, even if the potentiometer 33 is set correctly at a particular temperature level, the setting may not be correct over the operational temperature range of the system due to variations in the parameters of the transistors 30 and 31. Moreover, should either of the transistors 30 or 31 fail and require replacement, the prior art system must then again be adjusted, which is difficult to accomplish in the field. In addition, the capacitors 37 and 38 in the prior art circuit are susceptible to stray leakage paths which cause errors and, finally, the diode bridge 30 must be precisely matched to operate satisfactorily over the operational range of the system.

The discriminator circuit used in the system of the present invention, in one embodiment, is shown in FIG. 3. In the circuit of FIG. 3, the output from the low-pass partition filter 8 is applied to an input terminal 41 which, in turn, is connected to a resistor 43 and capacitor 44 connected to form the cosine filter 10. The output terminal of the cosine filter is connected to the negative input of a voltage comparator 53 of usual construction.

The output from the partition filter 9, on the other hand, is introduced to an input terminal 42 connected to a capacitor 46 and resistor 47, which are connected to form the sine filter 11. The output of the sine filter is connected to the source electrode of a field effect transistor 52, and the output of the voltage comparator 53 is connected to the gate electrode of the field effect transistor. The drain electrode of the field effect transistor is connected to the output terminal 40 of the discriminator. A pair of oppositely-connected diodes 49 and 50 are connected to the source electrode of the field effect transistor 52 and to a point of reference potential. The resistor 56 is connected to the positive input of the voltage comparator 53 and to the source of reference potential. A resistor 55 is connected between the output of the voltage comparator and the positive input.

The cosine filter 10 of the discriminator of FIG. 3 is similar to the cosine filter in the prior art discriminator of FIG. 2, the cosine filter 10 of FIG. 3 introducing an output voltage 62 to the negative input of the voltage comparator 53. The sine filter 11 in the circuit of FIG. 3, however, is constructed somewhat differently from the sine filter in the prior art circuit of FIG. 2. Specifically, the sine filter 11 in the circuit of FIG. 3 includes the capacitor 46 and resistor 47 connected in series, with the output 60 being introduced to the source electrode of the field effect transistor 52. The field effect transistor 52 may be of the metal oxide silicon type, designated "MOSFET."

As stated above, the output 62 of the cosine filter 10 in the circuit of FIG. 3 is connected to the negative, or inverting input of the voltage comparator 53. The voltage comparator may be an integrated circuit of the type presently designated LM111. The output 64 of the comparator 53 is a digital type signal having only two states such as +15 volts and −15 volts. The resistors 55 and 56 provide a small amount of hysteresis in the voltage comparator. The digital output 64 of the voltage comparator is applied as the gate input of the field effect transistor 52, the output of which is obtained from the drain of the field effect transistor, as mentioned above.

The principle of operation of the system of the present invention, incorporating the discriminator circuit of FIG. 3, is predicated on the fact that it is not necessary to perform a true multiplication of the sine and cosine signals in the discriminator for the proper operation of the overall system. The system of the invention achieves a degree of simplification by discarding some of the information contained in the input signals to the discriminator.

The sine channel remains the same as in the prior art system of FIG. 2, but only the zero crossing information is retained in the cosine channel. Specifically, the comparator 53 produces a digital waveform whose axis crossings coincide with the axis crossings of the cosine signal output 62, if hysteresis effects are neglected. The overall effect is that the sine channel signal is merely phase detected by a digital version of the cosine channel signal.

In order to obtain optimum fluctuation performance, the cut-off frequencies of both the sine filter 11 and of the cosine filter 10 are adjusted to be approximately equal to one-half the bandwidth of the spectrum being tracked. The actual values of the resistors 43 and 47 and of the capacitors 44 and 46 are determined by the expression:

$$w_o = 1/RC$$

Where:
 $w_o$ = the desired cut-off frequency in radians.

The cosine channel and sine channel input signals applied to the input terminals 41 and 42 are identical in terms of their basic characteristics, since they are processed in two identical channels. The difference between the input signals lies in the fact that, as described above, their signal components are 90° out of phase. The cosine channel input 61 may, for example, appear as shown in FIG. 4. The low pass characteristics of the cosine filter 10 in the circuit of FIG. 3 yields the output 62. Resistors 55 and 56 are chosen to provide a small amount of hysteresis 63 (FIG. 4), typically ± 50 mv, around the zero voltage switching point. The purpose of the hysteresis is to avoid any oscillation or spurious zero crossings which would affect the performance of the system. The resulting digital output 64 of the comparator is typically 30-volts peak-to-peak.

Although the input to the sine filter 11 in the circuit of FIG. 3 is similar to that of the cosine channel, the operation of the sine channel is completely different. The sine channel filter 11 consists, as described above, of a capacitor 46 and resistor 47 connected in series. The output of the sine filter 11 is a current 60 which flows through the diodes 49 or 50 when the field effect transistor 52 is non-conductive; and through the field effect transistor to the summing point of the integrator 13 by way of the output terminal 40, when the field effect transistor is conductive.

The voltage at the output of the sine filter is never more than ± .6-volts because of the limiting action of the diodes 49 and 50. Since the input voltage to the sine filter 11 is typically 18 volts peak-to-peak, and is much larger than the output voltage, the current flow through the sine filter 11 is for practical purposes equal to the current which would flow through the resistance-capacitance combination of the filter if its output were connected to ground. Thus, the cut-off frequency of the sine filter 11 is determined in the same manner as for the cosine filter 10.

The digital waveform 64 at the output of the voltage comparator 53 provides the keying signal which alternately connects and disconnects the current 60 from the sine filter to the summing point of the integrator 13. As mentioned above, when the field effect transistor 52 is non-conductive, the current 60 flows through the diodes 49 or 50.

The basic improvement of the system of the present invention, incorporating the discriminator 20 of FIG. 3, as compared with the prior art system, is the improved performance, simplicity, and the elimination of the need for critical adjustments in the system of the invention. The elimination of the trim adjustment required in the prior art system is an important advantage of the system of the present invention. As described above, this adjustment has proven to be most difficult to make in the prior art systems, and its elimination is a real and significant advantage.

A small current offset occurs in the circuit of FIG. 3 when the diodes 49 and 50 are not matched. However, this offset is usually insignificant if diodes of the same type are selected. This mismatch tendency can be eliminated, as shown in the circuit of FIG. 5, when the two diodes are replaced by a single field effect transistor 58, known to the art as a "J" field effect transistor. The field effect transistor 58 provides the same function as the diodes 49 and 50, but is not susceptible to mismatch.

It will be appreciated, of course, that although particular embodiments of the system and concept of the present invention are shown in the accompanying drawings, and are described above, the invention is not limited to any particular implementation of the underlying concept. The modifications which can be made to the illustrated embodiments, and yet which come within the spirit and scope of the invention, are intended to be covered by the following claims.

What is claimed is:

1. In a frequency tracking system which comprises:

a cosine signal channel including a first modulator;

a sine signal channel including a second modulator;

input circuit means connected to said sine signal channel and to said cosine signal channel for introducing an input signal to the first and second modulators;

frequency-adjustable oscillator means for producing a pair of phase quadrature sine and cosine keying signals, said oscillator being connected to the sine and cosine channels for introducing said keying signals to said first and second modulators respectively;

a discriminator coupled to said modulators and responsive to the outputs thereof to produce an error signal;

integrator means connected to said discriminator and responsive to said error signal to produce a corresponding integral signal and for applying said integral signal to said oscillator to control the frequency thereof;

said discriminator including:

a low-pass cosine filter coupled to said first modulator in said cosine signal channel;

a high-pass sine filter coupled to said second modulator in said sine signal channel;

a keying circuit interposed between the output of one of the filters and the input of said integrator means; and circuit means connected to the output of the other of the filters for producing a digital signal having a first value when said output is on one side of a reference axis and having a second value when said output is on the other side of the reference axis, said circuit means applying said digital signal to said keying circuit to cause said keying circuit alternately to connect and disconnect the output of said one of said filters to the input of said integrator means for phase detection of said last-named output.

2. The combination defined in claim 1, in which said keying circuit is connected between the output of said sine filter and the input of said integrator means; and in which said circuit means is connected to the output of said cosine filter.

3. The combination defined in claim 2, in which said keying circuit includes a field effect transistor having source, gate and drain electrodes, the output of said sine filter being applied to said source electrode, the output of said circuit means being applied to said gate electrode, and the output from said drain electrode being introduced to the input of said integrator means.

4. The combination defined in claim 3, and which includes a pair of back-to-back diodes connected between said source electrode and a point of reference potential.

5. The combination defined in claim 3, and which includes a further field effect transistor connected between said source electrode and a point of reference potential, said second field effect transistor having a gate electrode connected to the gate electrode of said first field effect transistor.

6. The combination defined in claim 2, in which said circuit means comprises a voltage comparator circuit.

* * * * *